(12) United States Patent
Le Bars et al.

(10) Patent No.: US 7,827,594 B2
(45) Date of Patent: Nov. 2, 2010

(54) METHOD OF DISTRIBUTING SCRAMBLED SERVICES AND/OR DATA

(75) Inventors: Bernard Le Bars, Athis-Mons (FR); Theo Van Aalst, CB Waalre (NL)

(73) Assignee: Viaccess, La Defense (FR)

( * ) Notice: Subject to any disclaimer, the term of this patent is extended or adjusted under 35 U.S.C. 154(b) by 795 days.

(21) Appl. No.: 10/541,693

(22) PCT Filed: Dec. 11, 2003

(86) PCT No.: PCT/FR03/50161

§ 371 (c)(1), (2), (4) Date: Mar. 8, 2006

(87) PCT Pub. No.: WO2004/056109

PCT Pub. Date: Jul. 1, 2004

(65) Prior Publication Data

US 2006/0147042 A1    Jul. 6, 2006

(30) Foreign Application Priority Data

Dec. 12, 2002    (FR) .................................. 02 15736

(51) Int. Cl.
*H04L 29/06* (2006.01)
*H04N 7/167* (2006.01)

(52) U.S. Cl. ........................ 726/4; 726/20; 726/27; 380/210; 380/247; 380/259; 380/279; 713/150

(58) Field of Classification Search ............... 725/5, 725/6, 25, 27, 86, 87, 100, 104, 131–135, 725/139–142, 151–153; 726/2–7, 10, 16, 726/20, 26–27; 380/10, 20, 21, 205, 210, 380/211, 227–229, 247–250, 255, 259, 260, 380/277–285; 713/150
See application file for complete search history.

(56) References Cited

U.S. PATENT DOCUMENTS

| 4,633,309 | A | * | 12/1986 | Li et al. .................... 380/242 |
| 5,748,732 | A | * | 5/1998 | Le Berre et al. ............ 380/229 |
| 6,405,369 | B1 | * | 6/2002 | Tsuria .......................... 725/6 |
| 2002/0051539 | A1 | * | 5/2002 | Okimoto et al. ............. 380/211 |
| 2003/0097563 | A1 | * | 5/2003 | Moroney et al. ............ 713/170 |

FOREIGN PATENT DOCUMENTS

FR    2 779 599    12/1999

\* cited by examiner

*Primary Examiner*—Benjamin E Lanier
*Assistant Examiner*—Hadi Armouche
(74) *Attorney, Agent, or Firm*—Oblon, Spivak, McClelland, Maier & Neustadt, L.L.P.

(57) ABSTRACT

A method and system for distribution of scrambled data and/or services to at least one master terminal and to at least one slave terminal linked with the master terminal. The method and system transmit to the master terminal a first secret code and transmit to each slave terminal a second secret code in a biunique relationship with the first secret code, and authorize the reception of the data and/or services by a slave terminal only if the first secret code is previously stored in the slave terminal.

17 Claims, 2 Drawing Sheets

METHOD OF DISTRIBUTING SCRAMBLED SERVICES AND/OR DATA

FIELD OF THE INVENTION

The invention relates to the field of secure data and/or service distribution in a network.

More specifically, the invention relates to a method for the distribution of scrambled data and/or services to at least one master terminal and to at least one slave terminal linked with said master terminal.

The invention also relates to a scrambled data and/or service distribution system comprising a central subscriber management module, an entitlement management message (EMM) generator, a scrambling platform.

The data and/or services are distributed to at least one master terminal and to at least one slave terminal each equipped with a security processor. The master and slave terminals may be computers or audiovisual receivers equipped with a decoder. The security processors are software programs saved in the memory of the computer or in the memory of a smart card.

STATE OF THE RELATED ART

When a subscriber has several scrambled data and/or service reception terminals, except a physical connection between the different terminals or the use of the backward channel (identification of incoming Tel No. or MAC (Medium Access Control) or @TP (Internet Protocol) address of each terminal), the operator does not have a simple solution enabling the control of the allocation of interdependent access rights to the subscriber's different terminals.

The aim of the invention is to provide operators with a simple method and system for allocating in a controlled manner interdependent access rights to the subscriber's different terminals.

DESCRIPTION OF THE INVENTION

The invention recommends a method for the distribution of scrambled data and/or services to a subscriber equipped with a master terminal to which are associated main access rights and with additional slave terminal to which are associated subsidiary access rights dependent on the main access rights.

The method according to the invention comprises the following steps:
  transmitting to the master terminal a first secret code $S_M$ and to each slave terminal a second secret code $S_S$ in a biunique relationship with the first code $S_M$,
  authorising the reception of the data and/or services by a slave terminal only if the first secret code $S_M$ is previously stored in said slave terminal.

In this way, a subscriber can receive the data and/or services on a main terminal for which it has previously acquired access rights and all or part of said data and/or services on several other secondary terminals for which it has acquired an access right associated with the main right, identical to said right or restricted with respect to said right and defined according to commercial choices or specific criteria for each terminal (receiver comprising parental, linguistic restriction, etc.).

For example, the operator may attribute a discount to a subscriber for a second subscription provided that said subscription is actually used only by said subscriber on their second terminal. In this way, the operator can protect itself against the fraudulent misuse of this commercial strategy if the use of the second subscription was technically restricted to the subscriber's second terminal.

In a preferred embodiment of the invention, the method according to the invention comprises the following steps:
  defining a first type of entitlement management messages (EMMm) to transmit the first secret code $S_M$ to the master terminal, and a second type of entitlement management messages (EMMs) to transmit the second secret code $S_S$ to each slave terminal,
  storing the first secret code $S_M$ in the master terminal and the second secret code $S_S$ in each slave terminal and for each use of a slave terminal,
  requesting that the first secret code $S_M$ be entered up in said slave terminal if said second secret code $S_S$ is not in a biunique relationship with the secret code $S_M$ saved in the slave terminal.

Advantageously, the method according to the invention also comprises a step consisting of generating at a variable frequency a new secret code $S_M$ and a new code $S_S$ in a biunique relationship with the secret code $S_M$.

In this case, the method comprises the following steps:
  defining a first type of entitlement management messages (EMMm) to transmit the new secret code $S_M$ to the master terminal, and a second type of entitlement management messages (EMMs) to transmit the new secret code $S_S$ to each slave terminal,
  storing this new secret code $S_M$ in the master terminal and the new secret code $S_S$ in each slave terminal and,
  for each use of a slave terminal,
  if this new secret code $S_S$ is not in a biunique relationship with the secret code $S_M$ previously stored in the slave terminal,
  requesting that the new secret code $S_M$ be entered up in said slave terminal.

In a particular embodiment, each terminal is linked with a smart card.

In an alternative embodiment, said smart card may be paired with the terminal.

The method according to the invention is used by a scrambled data and/or service distribution system comprising a central subscriber management module, an entitlement management message (EMM) generator and a scrambling platform.

According to the invention, this system also comprises:
  means to attribute to the master terminal a first secret code $S_M$, and to each slave terminal a second secret code $S_S$ in a biunique relationship with the first secret code $S_M$,
  control means intended to authorise the reception of the data and/or services by a slave terminal only if the first secret code $S_M$ is previously stored in said slave terminal.

In a first alternative embodiment, the system according to the invention comprises a single master terminal and a single slave terminal.

In a second alternative embodiment, the system according to the invention comprises a plurality of master terminals, and a plurality of slave terminals.

BRIEF DESCRIPTION OF FIGURES

Other characteristics and advantages of the invention will emerge from the description below, taken as a non-limitative example, with reference to the appended figures wherein.

DETAILED DESCRIPTION OF SPECIFIC EMBODIMENTS

In order to illustrate the method according to the invention, the description below concerns a context relating to the broadcasting of scrambled audiovisual programmes to subscribers connected to a digital television network.

Figure 1:
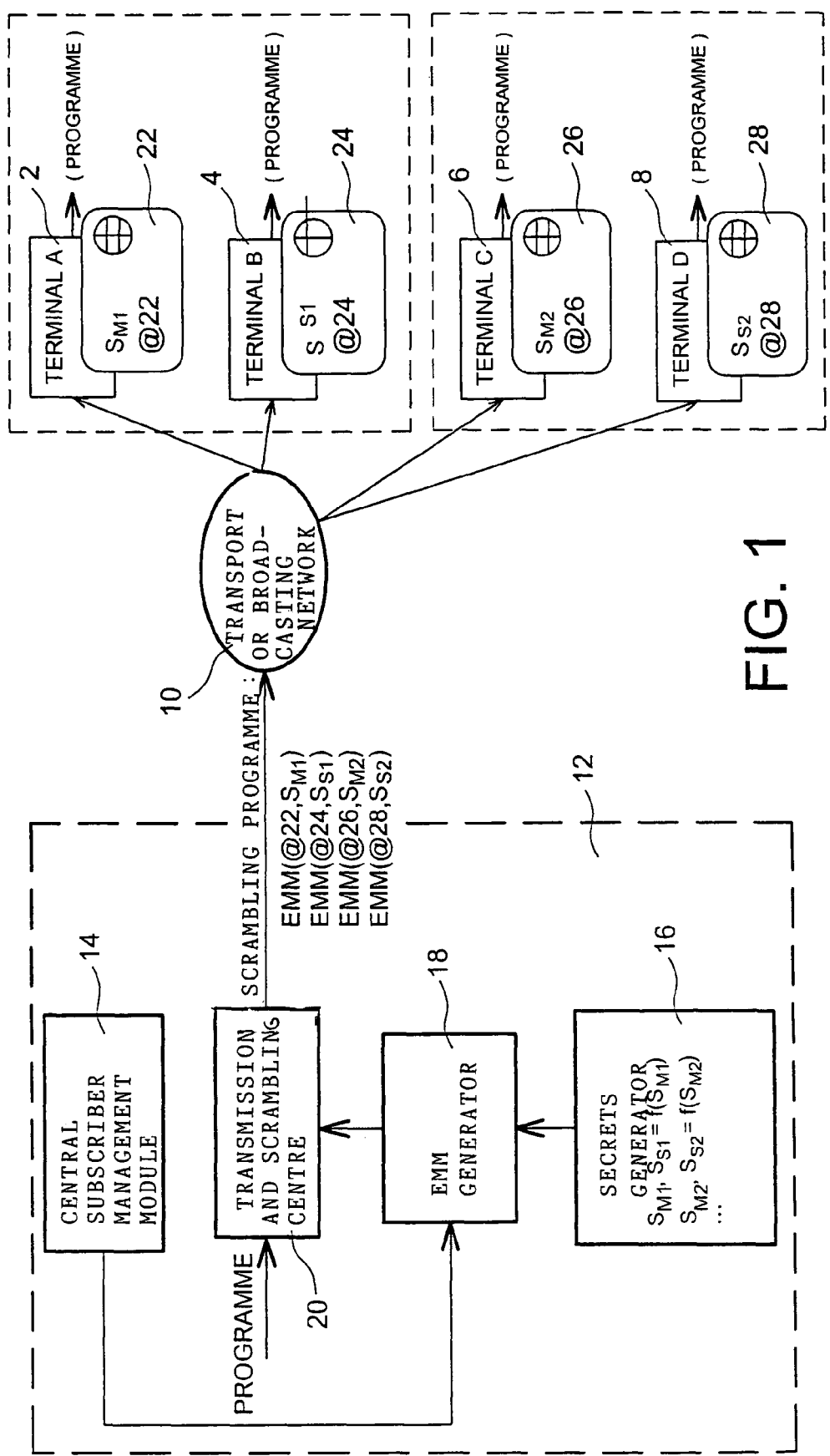
FIG. 1 represents a diagram of a system using the method according to the invention.

FIG. 1 illustrates schematically a first group of terminals 2, 4 of a first subscriber and a second group of terminals 6, 8 of a second subscriber connected, via a transport network 10, to a broadcasting system 12.

This broadcasting system comprises a central subscriber management module 14, a secret code generator 16 and an EMM entitlement management message generator 18 intended to carry the secret codes generated, and a scrambling platform 20.

The terminals 2, 4, 6 and 8 are linked, or paired, with a smart card 22, 24, 26 and 28, respectively.

The secret code generator 16 comprises a data processing module capable of defining a first secret code $S_{M1}$ and a second secret code $S_{M2}$, and of calculating a third secret code $S_{S1}$ as a function of the first secret code $S_{M1}$ and a fourth secret code $S_{S2}$ as a function of the second secret code $S_{M2}$.

The central subscriber management module 14 comprises a database containing information on each subscriber. This information relating, for example, to the number of terminals registered by the subscriber and the criteria associated with each terminal, such as, for example, the access rights already acquired or restrictions relating to the type of programmes that can be received by a terminal or the reception time slots.

The EMM generator 18 comprises a software module capable of generating messages EMM(@22,$S_{M1}$), EMM(@24,$S_{S1}$), EMM(@26, $S_{M2}$) and EMM(@28, $S_{S2}$) intended to carry the secret codes $S_{M1}$, $S_{M2}$, $S_{S1}$ and $S_{S2}$ and the reception criteria defined by the module 14 respectively for the terminal 2, terminal 4, terminal 6 and terminal 8 via the transport network 10.

The messages EMM(@22, $S_{M1}$), EMM(@24, $S_{S1}$), EMM(@26, $S_{M2}$) and EMM(@28, $S_{S2}$) are transmitted repeatedly to the subscriber's terminals.

On reception on these EMM messages, the secret codes $S_{M1}$, $S_{M2}$, $S_{S1}$ and $S_{S2}$ and the reception criteria defined by the module 14 are entered in the smart cards 22, 26, 24 and 28, respectively. These smart cards and/or the terminals comprise a software program capable of distinguishing between the master secret codes and the slave secret codes.

Figure 2A:
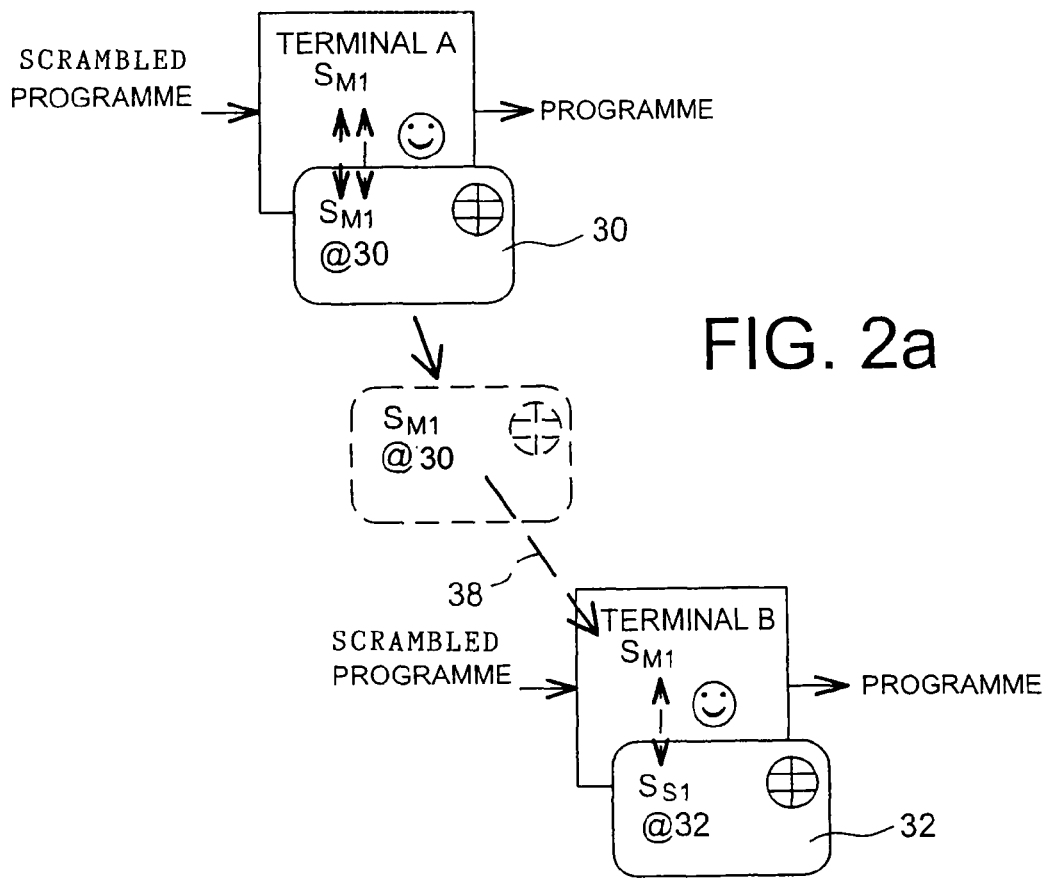
FIG. 2 represents schematically the operation of the system in FIG. 1.
Figure 2B:
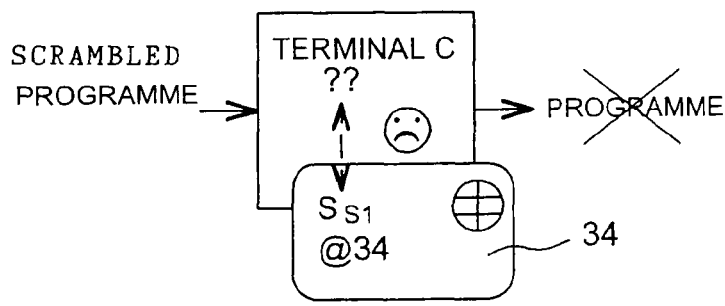
Figure 2C:
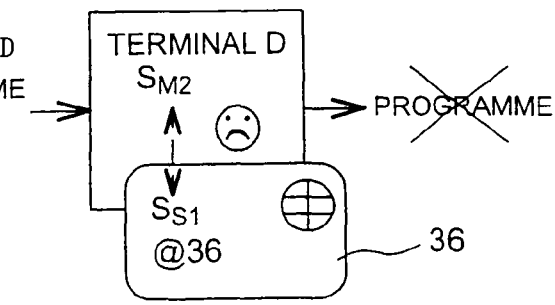

FIGS. 2a to 2c illustrate schematically three different situations wherein scrambled audiovisual programs are transmitted to a subscriber equipped with a master terminal A linked with a smart card 30 and three slave terminals B, C and D linked respectively with smart cards 32, 34 and 36.

In the case illustrated in FIG. 2a, the scrambled programmes are received by the master terminal A where they are descrambled conventionally by means of a control word transmitted in encrypted form in an ECM (Entitlement Control Message). The ECM message is processed in the terminal A after being deciphered by a user key previously entered in the smart card 30. The ECM determining programme access can be processed by the master terminal A because the smart card with which it is linked has a master secret code identical to that stored in the master terminal A. In this way, the secret codes of the card and the terminal can be controlled either by the card or by the terminal.

When the control is carried out in the card, if the secret codes $S_M$ and $S_S$ are in a biunique relationship, said card sends a deciphered ECM that can be processed on the terminal; otherwise, it does not send such an ECM to the terminal.

However, if the control is carried out in the terminal, the smart card sends a deciphered ECM and the terminal accepts or does not accept to process said ECM depending on whether the secret codes $S_M$ and $S_S$ are in a biunique relationship or are not.

In the case illustrated in FIG. 2a, the smart card 32 of the slave terminal B comprises a secret code $S_{S1}$ in a biunique relationship with the secret code $S_{M1}$ previously stored (arrow 38) in the slave terminal B by means of the smart card 30.

The scrambled programmes are received by the slave terminal B where they are descrambled conventionally by means of a control word transmitted in encrypted form in an ECM (Entitlement Control Message). The ECM message is processed in the terminal B after being deciphered by a user key previously entered in the smart card 32. The ECM determining programme access can be processed by the master terminal B because the smart card with which it is linked has a slave secret code corresponding in a biunique manner to the master secret code stored in the slave terminal B.

In this way, in this case also, the secret codes of the card and the terminal can be controlled either by the card or by the terminal.

In the case illustrated in FIG. 2b, the secret code $S_{M1}$ has not yet been transferred to the slave terminal C. It will not be possible to descramble the scrambled programmes received by this slave terminal C because the smart card 34 of the slave terminal C comprises a secret code $S_{S1}$ in a biunique relationship with the secret code $S_{M1}$.

In the case illustrated in FIG. 2c, the master secret code $S_{M2}$ transferred to the slave terminal D is not compatible with the secret code $S_{S1}$ entered in the smart card 36. It will also not be possible for the slave terminal D to receive the scrambled programmes received by the master terminal A.

In the different cases, whenever a user wishes to use a slave terminal in which the master secret code does not exist or is not compatible with the secret code of the smart card, an announcement is displayed on a screen to prompt the user to insert the smart card linked with the master terminal to transfer the master secret code to the slave terminal. The software program hosted in the smart card or in the terminal checks the compatibility of the master and slave secret codes and authorises the use of the slave terminal if these codes are compatible.

As a result, no slave terminal can be used without the authorisation of the master terminal. This makes it possible to prevent the fraudulent reception of scrambled programmes by a terminal not equipped with access rights.

The invention claimed is:

1. A method for distribution of scrambled data and/or services to at least one master terminal and to at least one slave terminal linked with the master terminal, the method comprising:

transmitting by a central management module to the master terminal a first secret code $S_m$ and transmitting by the central management module to each slave terminal a second secret code $S_s$;

storing the first secret code $S_m$ in the master terminal and the second secret code $S_s$ in each slave terminal;

for each use of a slave terminal by a user, checking whether the first secret code $S_m$ has previously been stored in the slave terminal, when the first secret code $S_m$ has previously been stored in the slave terminal, checking whether the first secret code $S_m$ is in a biunique relationship with the second secret code $S_s$, when the first secret code $S_m$ has not previously been stored in the slave terminal,
- inviting said user to enter the first secret code $S_m$ in said slave terminal, and
- checking whether the first secret code $S_m$ entered by the user in the slave terminal is in a biunique relationship with the second secret code $S_s$, authorizing the reception of the scrambled data and/or services by the slave terminal, when the first secret code $S_m$ is in a biunique relationship with the second secret code $S_s$, and prohibiting the reception of the scrambled data and/or services by the slave terminal, when the first secret code $S_m$ is not in a biunique relationship with the second secret code $S_s$;

defining a first type of entitlement management messages to transmit the first secret code to the master terminal, and defining a second type of entitlement management messages to transmit the second secret code to each slave terminal; and transmitting the first secret code to the master terminal within said first type of entitlement management messages (EMMm) and transmitting the second secret code to each slave terminal within said second type of entitlement management messages (EMMs).

2. A method for distribution of scrambled data and/or services to at least one master terminal and to at least one slave terminal linked with the master terminal, the method comprising:

transmitting by a central management module to the master terminal a first secret code $S_m$ and transmitting by the central management module to each slave terminal a second secret code $S_s$; storing the first secret code $S_m$ in the master terminal and the second secret code $S_s$ in each slave terminal;

for each use of a slave terminal by a user,
checking whether the first secret code $S_m$ has previously been stored in the slave terminal,
when the first secret code $S_m$ has previously been stored in the slave terminal,
checking whether the first secret code $S_m$ is in a biunique relationship with the second secret code $S_s$,
when the first secret code $S_m$ has not previously been stored in the slave terminal,
- inviting said user to enter the first secret code $S_m$ in said slave terminal, and
- checking whether the first secret code $S_m$ entered by the user in the slave terminal is in a biunique relationship with the second secret code $S_s$, authorizing the reception of the scrambled data and/or services by the slave terminal, when the first secret code $S_m$ is in a biunique relationship with the second secret code $S_s$, and prohibiting the reception of the scrambled data and/or services by the slave terminal, when the first secret code $S_m$ is not in a biunique relationship with the second secret code $S_s$;

generating at a variable frequency a new first secret code and a new second secret code;

transmitting by the central management module to the master terminal the new first secret code and to each slave terminal the new second secret code;

storing the new first secret code in the master terminal and the new second secret code in each slave terminal and, for each use of the slave terminal by the user, checking whether the new first secret code has previously been stored in the slave terminal,
when the new first secret code has previously been stored in the slave terminal,
checking whether the new first secret code is in a biunique relationship with the new second secret code,
when the new first secret code has not previously been stored in the slave terminal,
- inviting the user to enter the new first secret code in the slave terminal, and
- checking whether the new first secret code entered by the user in the slave terminal is in a biunique relationship with the new second secret code, authorizing the reception of the scrambled data and/or services by the slave terminal, when the new first secret code is in a biunique relationship with the new second secret code, and prohibiting the reception of the scrambled data and/or services by the slave terminal, when the new first secret code is not in a biunique relationship with the new second secret code.

3. The method according to claim 2, further comprising:

defining a first type of entitlement management messages (EMMm) to transmit the new first secret code to the master terminal, and defining a second type of entitlement management messages (EMMs) to transmit the new second secret code to each slave terminal;

transmitting the new first secret code to the master terminal within said first type of EMMm and transmitting the new second secret code to each slave terminal within said second type of EMMs, storing the new first secret code in the master terminal and storing the new second secret code in each slave terminal; and for each use of the slave terminal,
checking whether the new first secret code has previously been stored in the slave terminal,
when the new first secret code has previously been stored in the slave terminal,
checking whether the new first secret code is in a biunique relationship with the new second secret code,
when the new first secret has not previously been stored in the slave terminal,
- inviting the user to enter the first secret code in the slave terminal, and
- checking whether the new first secret code entered by the user in the slave terminal is in a biunique relationship with the new second secret code, authorizing the reception of the scrambled data and/or services by the slave terminal, when the new first secret code is in a biunique relationship with the new second secret code, and prohibiting the reception of the scrambled data and/or services by the slave terminal, when the new first secret code is not in a biunique relationship with the new second secret code.

4. The method according to claim 1, wherein each terminal comprises a security processor.

5. The method according to claim 4, wherein the security processor comprises a smart card linked with the terminal.

6. The method according to claim 5, wherein the smart card is paired with the terminal.

7. A scrambled data and/or service distribution system for at least one master terminal and at least one slave terminal, each equipped with a security processor, the system comprising:

a central management module configured to transmit to the master terminal a first secret code $S_m$, and to transmit to each slave terminal a second secret code $S_s$; and the at least one slave terminal, wherein each slave terminal includes a processor configured to, for each use of the slave terminal by a user, check whether the first secret code $S_m$ has previously been stored in the slave terminal, when the first secret code $S_m$ has previously been stored in the slave terminal, check whether the first secret code $S_m$ is in a biunique relationship with the second secret code $S_s$, when the first secret code $S_m$ has not previously been stored in the slave terminal, invite said user to enter the first secret code $S_m$ in said slave terminal, and check whether the first secret code $S_m$ entered by the user in the slave terminal is in a biunique relationship with the second secret code $S_s$, authorize the reception of the scrambled data and/or services by the slave terminal, when the first secret code $S_m$ is in a biunique relationship with the second secret code $S_s$, and prohibit the reception of the scrambled data and/or services by the slave terminal, when the first secret code $S_m$ is not in a biunique relationship with the second secret code $S_s$ wherein the central management module is configured to
    define a first type of entitlement management messages to transmit the first secret code to the master terminal,
    define a second type of entitlement management messages to transmit the second secret code to each slave terminal,
    transmit the first secret code to the master terminal within said first type of entitlement management messages (EMMm), and
    transmit the second secret code to each slave terminal within said second type of entitlement management messages (EMMs).

8. The system according to claim 7, wherein the at least one master terminal is a single master terminal and the at least one slave terminal is a single slave terminal.

9. The system according to claim 7, wherein the at least one master terminal is a plurality of master terminals and the at least one slave terminal is a plurality of slave terminals.

10. The method according to claim 1, wherein the slave terminal is not authorized to be used by said user when said first secret code $S_m$ is not already stored in the slave terminal or when said second secret code $S_s$ is not in a biunique relationship with the secret code $S_m$ previously saved in the slave terminal.

11. The method according to claim 2, wherein each terminal comprises a security processor.

12. The method according to claim 11, wherein the security processor comprises a smart card linked with the terminal.

13. The method according to claim 12, wherein the smart card is paired with the terminal.

14. The method according to claim 2, wherein the slave terminal is not authorized to be used by said user when said first secret code $S_m$ is not already stored in the slave terminal or when said second secret code Ss is not in a biunique relationship with the secret code $S_m$ previously saved in the slave terminal.

15. A scrambled data and/or service distribution system for at least one master terminal and at least one slave terminal, each equipped with a security processor, the system comprising:

a central management module configured to transmit to the master terminal a first secret code $S_m$, and to transmit to each slave terminal a second secret code $S_s$; and the at least one slave terminal, wherein each slave terminal includes a processor configured to, for each use of the slave terminal by a user, check whether the first secret code $S_m$ has previously been stored in the slave terminal, when the first secret code $S_m$ has previously been stored in the slave terminal, check whether the first secret code $S_m$ is in a biunique relationship with the second secret code $S_s$, when the first secret code $S_m$ has not previously been stored in the slave terminal, invite said user to enter the first secret code $S_m$ in said slave terminal, and check whether the first secret code $S_m$ entered by the user in the slave terminal is in a biunique relationship with the second secret code $S_s$, authorize the reception of the scrambled data and/or services by the slave terminal, when the first secret code $S_m$ is in a biunique relationship with the second secret code $S_s$, and prohibit the reception of the scrambled data and/or services by the slave terminal, when the first secret code $S_m$ is not in a biunique relationship with the second secret code $S_s$, wherein the central management module is configured to
    generate at a variable frequency a new first secret code and a new second secret code, and
    transmit to the master terminal the new first secret code and to each slave terminal the new second secret code, the master terminal is configured to store the new first secret code, each slave terminal is configured to store the new second secret code, and the processor included in each slave terminal is configured to, for each use of the slave terminal by the user,
    check whether the new first secret code has previously been stored in the slave terminal,
    when the new first secret code has previously been stored in the slave terminal,
        check whether the new first secret code is in a biunique relationship with the new second secret code,
    when the new first secret code has not previously been stored in the slave terminal,
        invite the user to enter the new first secret code in the slave terminal, and
        check whether the new first secret code entered by the user in the slave terminal is in a biunique relationship with the new second secret code,
    authorize the reception of the scrambled data and/or services by the slave terminal, when the new first secret code is in a biunique relationship with the new second secret code, and
    prohibit the reception of the scrambled data and/or services by the slave terminal, when the new first secret code is not in a biunique relationship with the new second secret code.

16. The system according to claim 15, wherein the at least one master terminal is a single master terminal and the at least one slave terminal is a single slave terminal.

17. The system according to claim 15, wherein the at least one master terminal is a plurality of master terminals and the at least one slave terminal is a plurality of slave terminals.

* * * * *